S. GODDARD.
TIRE CHAIN.
APPLICATION FILED MAY 3, 1919.
1,338,009.
Patented Apr. 27, 1920.
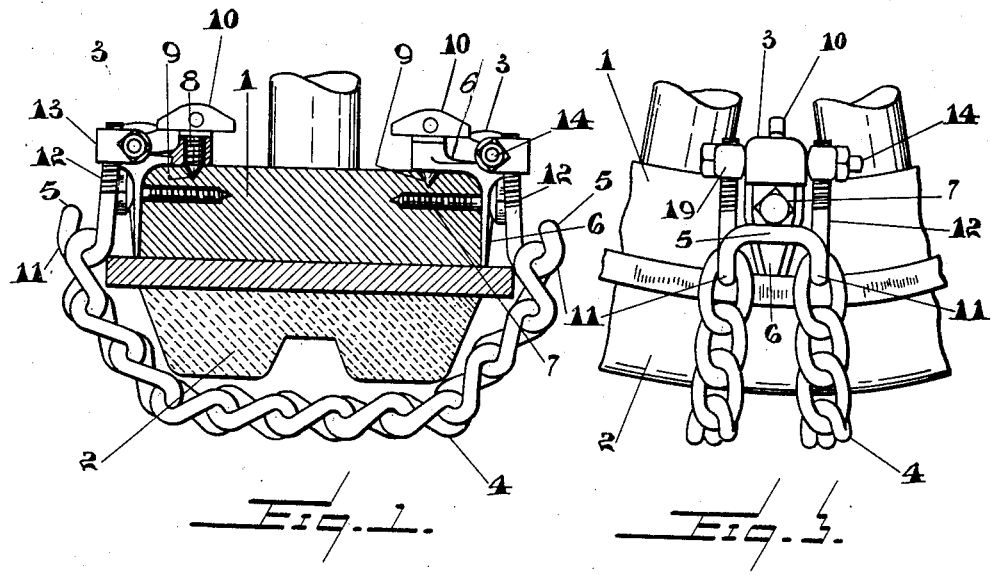
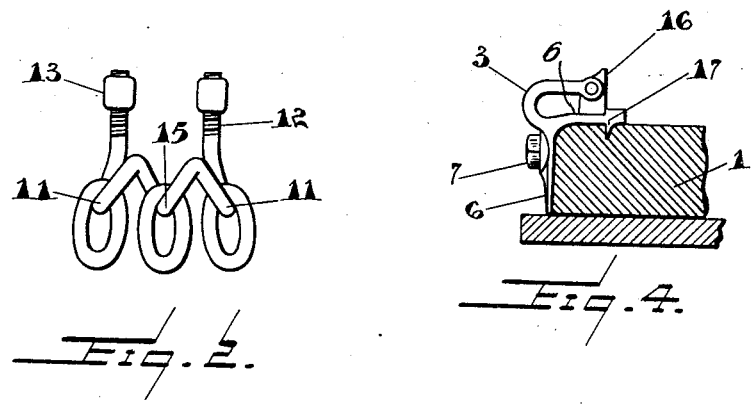
INVENTOR
S. Goddard.
BY J. Edward Maybee.
ATTY.

UNITED STATES PATENT OFFICE.

STEWART GODDARD, OF TORONTO, ONTARIO, CANADA.

TIRE-CHAIN.

1,338,009.  Specification of Letters Patent.  Patented Apr. 27, 1920.

Application filed May 3, 1919. Serial No. 294,543.

*To all whom it may concern:*

Be it known that I, STEWART GODDARD, a subject of the King of Great Britain, and resident of the city of Toronto, in the county of York, Province of Ontario, Canada, have invented certain new and useful Improvements in Tire-Chains, of which the following is a specification.

This invention relates to tire chains especially adapted for use with solid rubber tired truck wheels. The present practice is to provide a plurality of independent single chains each held in place by fastening means connected with or between the spokes.

I find that the single chains have a very destructive effect on the rubber tires and that the ordinary fastening means involve the use of too great a total length of chain in proportion to the part which actually contacts with the road surface, and my object is to devise simple means for securing chains to the felly of the wheel in sets of two or three so that the width of chain which is interposed between the road and the tire when a chain is in road gripping position is very much greater than with the ordinary single chains and the chance of damage to the tire thus materially reduced.

I attain my object by means of the constructions hereinafter described and illustrated in the accompanying drawings in which—

Figure 1 is a cross section showing my tire chain applied to a wheel provided with a double solid rubber tire;

Fig. 2 a side elevation of a modified form of connection suitable for a triple chain construction;

Fig. 3 a side elevation of the construction shown in Fig. 1; and

Fig. 4 a cross section of part of a wheel rim showing a modified form of the hook.

In the drawings like numerals of reference indicate corresponding parts in the different figures.

1 is a wheel rim, to which a solid rubber tire 2 is connected in the usual manner. My device in its main features comprises hooks 3, which will be permanently connected to the wooden rim or felly of the wheel, a plurality of chains 4 and connectors 5 to which the ends of the chain are connected and which themselves are adapted to be engaged on the hooks 3. The hooks are provided with ears 6 fitting respectively against the side and inner periphery of the wooden rim. In the ear fitting against the side of the rim is formed a hole for the passage of a screw or bolt 7. I show a wood screw with square head which is screwed into the wooden rim. In the ear which fits against the inner circumference of the rim, I form a threaded hole into which is screwed a screw 8 having a point 9 adapted to embed itself in the wooden rim when the screw is turned down. The screw is provided with a T-head 10 which may be turned as shown in Fig. 1 to close the opening of the hook 3, but which may be turned to a position to permit of the connector 5 being disengaged from the hook.

Each connector is formed of two hooks 11 provided with threaded stems 12, each of which is threaded through a block 13. These blocks are provided with holes for the passage of a pin 14, which may be engaged with one of the hooks 3, as shown. Preferably this pin is formed as a bolt. Preferably also the hooks are formed integral with one another as shown so that the chains cannot become disengaged from the connectors when the connectors are in position as shown.

For very heavy trucks in which very wide tread for the chain surface is desirable, an intermediate loop 15 may be formed between the hooks 11 into which the end of a third chain may be hooked as shown in Fig. 2.

The device is very quickly attached once the sides of the hooks have been placed in position, it being merely necessary to hook the pins 14 into the hooks 11 and then to turn the T-heads 10 to prevent any accidental disengagement of the pins. If the chains are too loose, one or both connectors may be disengaged, the pins 14 removed and the blocks 13 screwed down on the stems until a sufficient amount of slack is taken up, when the pins are replaced and the connectors locked into position once more. Any broken chain is readily replaced by removing the connectors, removing the pins 14 therefrom, unscrewing the blocks and then hooking a new chain into position. The disconnected parts are then replaced and the connectors hook into position once more.

In Fig. 4 a modification of the hook is shown which is in some respects more convenient for use at the inside of the wheel than the form shown in Figs. 1 and 3. The hook in its main features is exactly the same, but it is provided at its inner end with a spike 17 adapted to be driven into the wooden rim. The hook is somewhat deeper and is provided with a pivoted latch 16 which will rock easily to permit of a connector pin being placed in position, but will resist accidental displacement.

What I claim as my invention is:—

1. A wheel provided with a tire, in combination with a plurality of tire chains side by side extending across the tire, and means for securing the ends of the chains to the wheel comprising common connectors for the chain ends adapted to be threaded through the end links of the chains; a removable cross bar connecting the ends of each connector; and hooks secured in place at opposite sides of the wheel rim, with which hooks the cross bars are engaged.

2. In the device constructed as set forth in claim 1, the provision of loops in each connector to space the chains.

3. The combination of a plurality of tire chains and two connectors for the chain ends, each comprising two hooks with threaded stems, blocks into which said stems are threaded, and a removable cross bar connecting each pair of blocks.

4. The combination of a plurality of tire chains and two connectors for the chain ends, each comprising two hooks integrally connected and provided with threaded stems, blocks into which said stems are threaded, and a removable cross bar connecting each pair of blocks.

5. The combination of a plurality of tire chains and two connectors for the chain ends, each comprising two hooks integrally connected, formed with an intermediate loop for the connection of a chain and provided with threaded stems, blocks into which said stems are threaded, and a removable cross bar connecting each pair of blocks.

STEWART GODDARD.